United States Patent [19]

Shimonou

[11] Patent Number: 5,046,058
[45] Date of Patent: Sep. 3, 1991

[54] TRACK ACCESS APPARATUS HAVING A LEARNING CONTROL FOR POSITIONING A TRANSDUCER FOR A DISC-SHAPED RECORDING MECHANISM

[75] Inventor: Shigeru Shimonou, Tokyo, Japan

[73] Assignee: NEC Corporation, Tokyo, Japan

[21] Appl. No.: 520,493

[22] Filed: May 25, 1988

Related U.S. Application Data

[63] Continuation of Ser. No. 65,671, Jun. 22, 1987, abandoned, which is a continuation of Ser. No. 910,295, Sep. 17, 1986, abandoned, which is a continuation of Ser. No. 549,842, Nov. 8, 1983, abandoned.

[30] Foreign Application Priority Data

Nov. 8, 1982 [JP] Japan .................. 57-195489

[51] Int. Cl.⁵ ............................................. G11B 7/085
[52] U.S. Cl. .................................. 369/32; 360/78.09; 369/44.28
[58] Field of Search ............... 369/30, 32, 33, 41, 369/48, 44.25, 44.28–44.29, 44.32, 44.34, 44.35; 360/75, 78.04, 78.09, 78.11

[56] References Cited

U.S. PATENT DOCUMENTS

| | | | |
|---|---|---|---|
| 3,881,184 | 4/1975 | Koepcke et al. | 360/78 |
| 4,057,832 | 11/1977 | Kappert | 369/46 X |
| 4,103,314 | 7/1978 | Case | 360/78 |
| 4,133,011 | 1/1979 | Kurzweil, Jr. | 360/78 |
| 4,166,970 | 9/1979 | Cardot et al. | 360/78 X |
| 4,355,273 | 10/1982 | Du Vall | 360/78 X |
| 4,381,526 | 4/1983 | McLaughlin et al. | 360/78 |
| 4,494,159 | 1/1985 | Takayama et al. | 360/78 |
| 4,510,537 | 4/1985 | Yoshida et al. | 360/78 |
| 4,544,968 | 10/1985 | Anderson et al. | 360/78 |

Primary Examiner—Roy N. Envall, Jr.
Assistant Examiner—W. R. Young
Attorney, Agent, or Firm—Sughrue, Mion, Zinn, Macpeak & Seas

[57] ABSTRACT

A controller for moving a transducer between recording tracks, comprising a current driven actuator for accelerating and decelerating the transducer for determined periods, position and velocity detectors of the transducer at the end of deceleration, error signal generators for the final position and velocity, and circuitry for increasing or decreasing periods of acceleration and deceleration based on the error signals.

4 Claims, 2 Drawing Sheets

TRACK ACCESS APPARATUS HAVING A LEARNING CONTROL FOR POSITIONING A TRANSDUCER FOR A DISC-SHAPED RECORDING MECHANISM

This is a continuation of application Ser. No. 065,671 filed June 22, 1987, which is a continuation of application Ser. No. 910,295 filed Sept. 17, 1986 which is a continuation of application Ser. No. 549,842 filed Nov. 8, 1983, all abandoned.

The present invention relates to a track access apparatus for positioning a transducer, such as a magnetic head or an optical head (more precisely, an optical beam), onto any one of a number of information tracks formed on a disc-shaped recording medium such as a magnetic disc device or an optical disc device.

In an optical or magnetic disc system, a number of information tracks are formed approximately concentrically on a disc-shaped recording medium, and the transducer is positioned adjacent to these information tracks when recording information thereon or reading it therefrom. In order to record information on a desired track or read it therefrom in such a system, it is necessary to transfer the transducer to a target track from the track which it is currently tracing.

In order to transfer the transducer from one track to another in an accurate and stable manner, it is desirable to detect in succession the position and relative velocity of the transducer in relation to the target track, and feed back this data to control the transfer. It is difficult, however, to detect successively and accurately the position of the transducer between the tracks it is crossing, although it is possible to detect it accurately near the center of the tracks. Moreover, a complicated system is needed to perform an accurate feedback control over the entire transfer from one track to another, and therefore, a method wherein a simpler structure is employed is desirable to simplify the device and reduce the cost therefor.

For this purpose, a method called "track jump" has been used for transferring the optical beam onto an adjacent track in the optical disc system. In this method, the beam is transferred by a prescribed distance by applying a preset voltage or current for acceleration and deceleration, for a predetermined period, to an actuator which transfers the beam by moving a lens or a mirror. This method provides a very simple structure, since it only needs a control circuit generating an acceleration current (or voltage) pulse and a deceleration current (or voltage) pulse of fixed amplitude and pulse width. Moreover, it is unnecessary to detect the position and velocity of the beam between tracks, since no feedback is conducted.

With this method, however, it can not be expected that the beam stops at the target position at the completion of deceleration in case where the characteristics of the actuator, the mass (inertia) of the movable components, and the spacing of the tracks, vary from values estimated when the pulse width is set, because the pulse width of the accelerating and decelerating currents is not modified from its preset value. In practice, slight differences in position and velocity, even if they occur at the end of deceleration, do not necessarily lead to a seriously erroneous operation, since a servo loop is constituted so that any error in the position of the optical beam on the target track is modified by a shift to a tracking-control operation for the target track after the completion of deceleration. When the differences are large, however, it is impossible to reach the target track even by the shift to the tracking-control operation, and thus an erroneous operation occurs.

It is necessary to set the current value and pulse width of the accelerating and decelerating current pulses as correctly as possible in order to reduce these differences in position and velocity at the end of deceleration. But even so, differences in the spacing between tracks from the set value, thermal fluctuations of the characteristics of the actuator, and temporal changes thereof are inevitable, and it is impossible in practice to adjust the set value for each of a number of systems in which actuators having characteristics slightly different from each other are used. Accordingly, the track-jump method, although simple, can not enable the stable operation of the system.

To avoid this problem, there is proposed an improved system in the U.S. Pat. No. 4,057,832 entitled "APPARATUS FOR READING A DISK-SHAPED RECORD CARRIER WITH TRACK JUMPING FOR CHARGING MOTION EFFECTS" wherein the arrival of the optical beam at the intermediate point between two tracks during its transfer from one track to another is detected, and a decelerating current is applied just for the same period as that during which accelerating current was impressed on the actuator to stop the beam exactly at the target position.

According to this method, however, it is necessary to detect accurately the position of the intermediate point between the tracks, and thus a desirable performance can not be expected in the optical or magnetic disc system wherein the detection of the exact position is difficult, at places away from the center between tracks. In addition, the actuator can not necessarily be expected to show the same characteristics in acceleration and deceleration, and accordingly it can be assumed that the deceleration will be larger for the same current value due to air resistance and viscous resistance. This means that the shift from acceleration to deceleration at the intermediate point does not necessarily enable a stable stop of the beam at the exact position required. Moreover, since the track jump is performed within a short period of time of 1 ms or less, the series of controls must be performed at very high speeds to switch the sample acceleration and deceleration for the time required for the detection of the intermediate point, and this requires a high-speed, expensive circuit.

SUMMARY OF THE INVENTION

An object of the present invention is to provide a track access device which enables a high-speed, stable and accurate transfer of a transducer from one track to another where no successive and exact signals of position and velocity need be detected.

The present invention removes the necessity not only of the detection of the position and velocity during the transfer from one track to another, but also the high-speed control and feedback control of the position and velocity during the transfer operation, thus also removing the necessity of a specific circuit for high-speed operation.

Moreover, according to the present invention, an actuator transferring a transducer can be made to conduct the acceleration and deceleration at the maximum permitted levels of acceleration and deceleration and thereby stop the transducer at the exact target position, and therefore both the effective use of electric power and the high-speed transfer of the transducer can be realized.

The features and advantages of the present invention will be apparent from the following detailed description of a preferred embodiment of the present invention taken in conjunction with the accompanying drawings.

DETAILED DESCRIPTION OF THE PREFERRED EMBODIMENT

Figure 1:
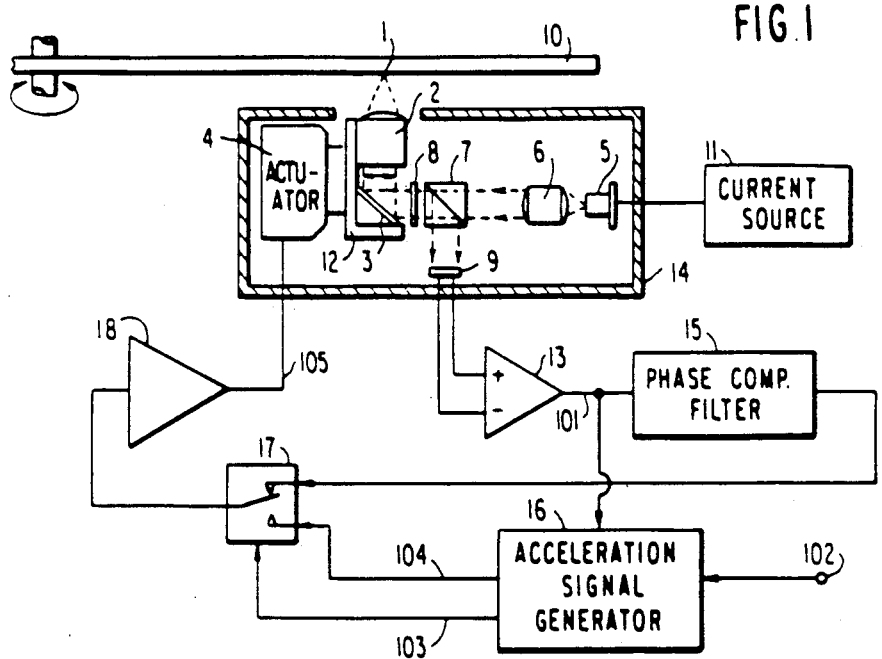
FIG. 1 is a block diagram of an embodiment of the present invention.

Referring to FIG. 1, in an optical disc system according to the embodiment of the present invention, a massless optical beam spot 1 tracks information tracks on a recording medium (optical disc) 10, follows the track, and is transferred from one track to another. Ideally, a massless optical beam spot 1 can be transferred within an extremely small period of time. In practice, however, the optical beam spot 1 is transferred by moving an objective lens 2 or a reflector 3, or both of them, and therefore an actuator 4 moving these objects is employed for transferring the optical beam spot 1. Although an optical disc system does not have an element like the magnetic head of a magnetic disc system which can be stipulated definitely as an information transducer which traces information tracks and records and reproduces information, the description hereunder regards a movable component consisting of the objective lens 2 and the reflector 3, which is a transfer unit for tracing tracks and accessing them, as an element equivalent to the information transducer.

When supplied with a current from a laser current source 11, a semiconductor laser 5 emits a laser beam, which is transformed into a parallel beam by a collimator lens 6. The beam falls on the reflector 3 via a polarizing beam splitter 7 and a ¼ wavelength plate 8, and the laser beam reflected by the reflector 3 is converged by the objective lens 2 into a very small optical beam spot 1 formed on the recording medium 10. The objective lens 2 and the reflector 3 are fitted onto a common arm 12 and moved together by the actuator 4.

The laser beam reflected by the record again passes through the objective lens 2 and the reflector 3, and after the angle of polarization thereof is rotated by the ¼ wavelength plate 8 and the optical path thereof is deflected by the polarizing beam splitter 7, the beam falls onto an optical detector 9 detecting any tracking difference. The detector 9 outputs a current corresponding to changes in the intensity distribution of a reflected light beam whose intensity distribution is changed by tracking information recorded on the surface of the recording medium 10. A differential amplifier 13 receives the output from the detector 9 and delivers a tracking error signal 101 indicating the difference in position of the optical beam spot 1 from the track. The optical system from the semiconductor laser 5 to the tracking difference detector 9 is incorporated within a single frame 14, which is usually called an optical head. The optical beam spot can be transferred a relatively long distance over the surface of the recording medium 10 by moving the whole optical head, while the transfer thereof through a short distance, such as transfer between adjacent tracks, can be performed at higher speed by moving only the objective lens 2 and the reflector 3.

The tracking error signal 101, which is output from the differential amplifier 13, is input to a phase-compensating filter 15 and an acceleration-deceleration signal generator 16. When a tracking operation is being conducted, an output from the phase-compensating filter 15 is selected by a mode selection switch 17 and input to a power amplifier 18, and the power amplifier 18 supplies a current 105 proportional to this input to the actuator 4, thus forming a tracking servo loop. The phase-compensating filter 15 compensates the phase of the tracking error signal 101 for the stable operation of the tracking servo loop, a lead-lag filter is usually employed as this filter.

When the optical beam spot 1 is transferred from one track to another (e.g. to an adjacent track), a track-access instruction signal 102 goes on and, based on this signal, the acceleration-deceleration signal generator 16 makes a mode selection signal 103 go on to shift the mode selection switch 17, while generating an acceleration-deceleration signal 104. The acceleration-deceleration signal 104 is input to the power amplifier 18 through the mode selection switch 17, the power amplifier 18 supplies the actuator 4 with a current 105 corresponding to the acceleration-deceleration signal 104, and thereby the optical beam spot 1 is transferred. Needless to say, the direction of access can be reversed by reversing the polarity of the current supplied to the actuator 4, though this is not shown in the figures. Thus, the acceleration-deceleration signal generator 16 is operated in an adjusting mode of adjusting or modifying the present value of the acceleration and deceleration periods.

The distance through which the optical beam spot 1 is transferred and the velocity thereof at the end of the deceleration vary according to the periods and magnitudes of the acceleration and deceleration of the actuator 4. Therefore, errors in the position and velocity of the optical beam spot 1 with respect to the tracks are generated by the time the deceleration has ended, unless the amplitude of the acceleration-deceleration current 105 and the acceleration and deceleration periods are set correctly in relation to the distance between tracks and the characteristics of the actuator 4. Accordingly, in the device of the present invention, the acceleration-deceleration current 105 of an optimum period is always input to the actuator 4 by a method wherein the periods of accelerating and decelerating pulses of the acceleration-deceleration signal 104 generated by the acceleration-deceleration signal generator 16 are modified in accordance with the tracking error signal 101 output when the deceleration ends. When there is any difference in the amplitude and period of the acceleration-deceleration current 105 set beforehand, the position and velocity of the optical beam spot 1 at the end of the deceleration differ from target values (e.g. both are 0). Therefore, the acceleration-deceleration signal generator 16 detects any difference in position by comparing the tracking error signal 101 with a reference value, and detects any difference in velocity by comparing a velocity signal obtained from differentiation of the tracking error signal 101 with a reference value, and, based on these detected values, the preset values of the acceleration and deceleration periods are modified. Thus, the acceleration-deceleration signal generator 16 is operated in an adjusting mode or adjusting or modifying the present value of the acceleration and deceleration periods.

Thus, the periods of the acceleration and deceleration are modified every time a transfer is made from one track to another, and even when the initially set values for the acceleration and deceleration periods differ from the correct values, they are modified to the correct values during the course of several track accesses. Even if a change occurs in the distance between tracks, the characteristics of the actuator 4, accelerations and decelerations are always made thereafter with optimum time widths, and thus the optical beam spot 1 is transferred to a target track at high speed and in a stable and accurate manner.

Figure 2A:
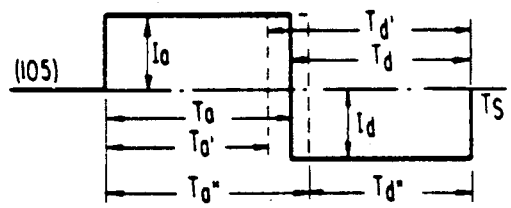
FIGS. 2(a), 2(b) and 2(c) are waveform diagrams showing an operation of the embodiment shown in FIG. 1.

FIG. 2(a) shows an example of the waveform of the acceleration-deceleration current 105 supplied to the actuator 4. Assuming that the actuator 4 is frictionless, and thus generates accelerations and decelerations accurately proportional to the current 105 supplied thereto, the actuator 4 (and thus the optical beam spot 1) is stopped stably at a time Ts at the completion of the deceleration by making the amplitude Ia of the acceleration current equal to the amplitude Id of the deceleration current, and by making the period Ta of the acceleration equal to the period Td of the deceleration.

Figure 2B:
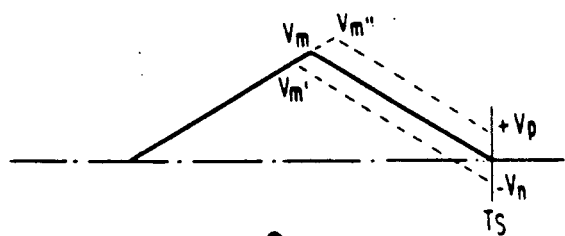

FIG. 2(b) is a conceptual drawing of the waveforms of the velocity of the actuator 4 or the optical beam spot 1. Although no signal indicating such a velocity is actually generated in the device of FIG. 1, it would be possible to obtain a velocity signal by fitting a velocity transducer to the actuator 4, or by some other means. When the acceleration current is supplied to the actuator 4 during the period Ta, the velocity of the actuator 4 increases, as shown by a solid line in FIG. 2(b), and reaches the maximum velocity Vm. Thereafter the deceleration current is supplied to the actuator 4 during the period Td, so that the velocity decreases, and the actuator 4 stops at time Ts.

Figure 2C:
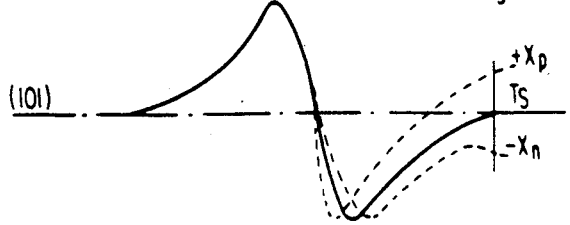

FIG. 2(c) shows typical waveforms of the tracking error signal 101 which is generated during the transfer of the optical beam spot 1 to another track. Although the tracking error signal 101 indicates almost exactly the position of the optical beam spot 1 with respect to the track only in the vicinity of the central position between tracks, it has an extremely inaccurate value at the intermediate point between tracks, since it is a signal which varies repeatedly in relation to transfers between tracks. Accordingly, it is difficult to control the access operation for the transfer between the tracks by using the tracking error signal 101. However, it is possible to detect the difference in position of the optical beam spot 1 when it reaches some point near the target track, and it is also possible to detect the velocity of the optical beam spot 1 in the vicinity of the target track by differentiating the tracking error signal 101. When the period Ta of acceleration and the period Td of deceleration of the actuator 4 are set properly, the value of the tracking error signal 101 is zero at time Ts when the deceleration ends, as shown by the solid line in FIG. 2(c), and thus the optical beam spot 1 stops exactly at the center of the target track.

When the period of acceleration has a value Ta' smaller than the correct value Ta, the maximum value of the velocity of the actuator 4 becomes Vm' smaller than the value Vm obtained when the acceleration period is correct. If the time Ts of the completion of deceleration does not change, the actuator 4 is decelerated during a period Td' of deceleration which is longer than Td, so that the velocity of the actuator 4 at the completion of deceleration is made then has a negative value $-Vn$, and thus the optical beam spot 1 returns towards its original position. This deceleration time causes the transfer distance to be shorter than that under correct acceleration and deceleration, the optical beam spot 1 starts to return to its original position before it reaches the target track, and thus a difference $-Xn$ in position from the target track has occured at time Ta when the deceleration ends. On the other hand, when the period of acceleration has a value Ta'' larger than the correct value Ta, the maximum value of the velocity of the actuator 4 becomes Vm'', larger than the value Vm, and if the time Ts of completion of deceleration does not change, the optical beam spot 1 is beyond the target track at the completion of the deceleration, causing a positional difference Xp and a velocity error Vp. These conditions can be caused not only by the variations in the acceleration and deceleration periods, but also by variations in the magnitudes of the acceleration and deceleration. Such phenomena that differences in velocity and position have been caused at the completion of the deceleration by changes in the acceleration and deceleration periods can be considered simply in the following way. Given that the acceleration during the acceleration period has a prescribed value and that the deceleration during the deceleration period has a value $-\alpha$ opposite polarity to $\alpha$ and equal thereto in absolute value, the vecocity Vs at the completion of the deceleration is expressed by the equation $Vs = \alpha (Ta - Td)$, wherein the acceleration period is Ta and the deceleration period Td. The distance transferred Xj is expressed by the formula $Xj = \frac{1}{2}\alpha (Ta^2 + 2TaTd - Td^2)$. When the correct values of the acceleration and deceleration periods required for stopping the optical beam spot 1 exactly at the center of the target track have the same value $T_R$, and differences in Ta and Td from $T_R$ are $\Delta Ta$ and $\Delta Td$ respectively, the difference in velocity $V_E$ at the completion of the deceleration from the set value is given by $V_E = \alpha (\Delta Ta - \Delta Td)$, while the difference in position $X_E$ is given by $X_E = \frac{1}{2}\alpha (2\Delta TaT_R + \Delta Ta^2 + 2(\Delta Ta + \Delta Td)T_R + 2\Delta Ta\Delta Td - 2\Delta TdT_R - \Delta Td^2)$. When $\Delta Ta$ and $\Delta Td$ are sufficiently smaller than $T_R$, $X_E$ is given approximately by $X_E = 2\alpha\Delta TaT_R$. This means that the difference in velocity at the completion of the deceleration is approximately proportional to the difference in time error between the acceleration period Ta and the deceleration period Td, and that the difference in position is effectively proportional to the time error in the acceleration period Ta, when the period Ta and the period Td differ from their correct values. Accordingly, when there is an error in velocity at the completion of the deceleration, it can be reduced by varying the difference between the acceleration period Ta and the deceleration period Td, and when there is an error in position, it can be reduced by varying the value of the acceleration period Ta. It is preferable to vary the deceleration period Td by the same amount as the acceleration period Ta when modifying a position error, because an alteration of the period Ta alone causes a change in the difference between the periods Ta and Td, which would result in a velocity error.

As described above, the position and velocity of the optical beam spot 1 in relation to the target track at the completion of the deceleration can be made to be a desirable value (zero, in general) by varying the acceleration period Ta and the deceleration period Td. Therefore, in the device of the present invention, values which give the acceleration and deceleration periods are modified by detecting errors in velocity and position at the completion of a deceleration. It is impossible to transfer the optical beam across the entire effective area of the record 1 by means of the actuator 4 alone. Therefore, a usual train of driving means, not shown in the figures, is provided for realizing such a transfer.

Figure 3:
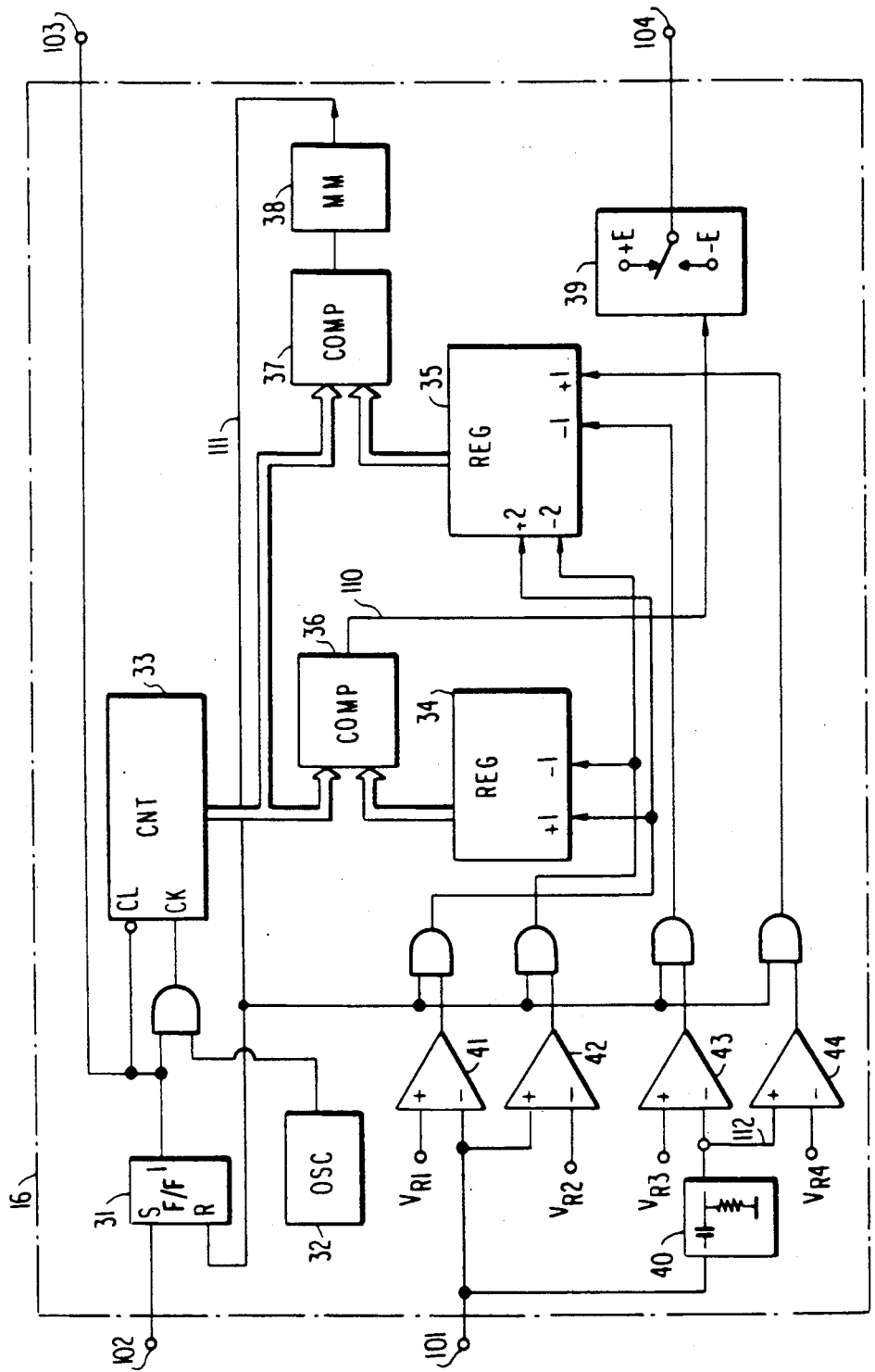
FIG. 3 is a block diagram of an acceleration-deceleration signal generator used in the embodiment.

FIG. 3 shows one embodiment of an acceleration-deceleration signal generator 16 used in the device shown in FIG. 1. When a track-access instruction signal 102 goes on, a flip-flop 31 is set, and simultaneously as a mode selection signal 103 goes on, a counter 33 is released from a cleared state and starts counting a clock pulse from an oscillator 32. The count of the counter 33 is compared by a comparator 36 with a value showing the acceleration period Ta held in a register 34.

The comparator 36 generates an acceleration-deceleration switching signal 110, and switches a switching voltage source 39 which generates a positive voltage for the acceleration as an acceleration-deceleration signal 104 until the count of the counter 33 reaches the value of the acceleration period Ta, and generates a negative voltage for the deceleration when the count of the counter 33 exceeds the value of the period Ta. A comparator 37 compares the count of the counter 33 with a value indicating the entire period of acceleration and deceleration (Ta+Td) held by a register 35. When the count of the counter 33 coincides with the value of the entire acceleration and deceleration period, the comparator 37 makes a monostable multivibrator 38 operate to generate a deceleration-completed pulse 111. Although the register 35 does not hold a value directly showing the deceleration period Td, it effectively shows the deceleration period, since the switching between acceleration and deceleration is done by the operations of the register 34 and the comparator 36. The generation of the deceleration-completion pulse 111 resets the flip-flop 31, and turns off the mode selection signal 103, while the counter 33 stops counting and is cleared.

When the deceleration ends, the optical beam spot 1 is close to the target track, and the tracking error signal 101 shows almost exactly the difference in position of the optical beam spot 1 from the target track. In addition, a velocity signal 112 showing the velocity of the optical beam spot 1 can be obtained by differentiating the tracking error signal 101 by a differentiator 40. A level comparator 41 compares the tracking error signal 101 with a negative position reference voltage $V_{R1}$ and determines whether the optical beam spot 1 is not positioned on the target track. Conversely, a level comparator 42 determines whether the position of the spot 1 is beyond the target track. A level comparator 43 detects that the velocity of the optical beam spot 1 is negative (that is, the optical beam spot is returning), while a level comparator 44 detects that the velocity of the optical beam spot is positive. These level comparators 41–44 each have a prescribed nonsensitive region, and they determine that there is no velocity difference and no position difference when the errors in position or velocity are within prescribed limits. When there is a negative difference in position when the deceleration-completed pulse 111 is generated, 1 is added to the value held by the register 34, and 2 is added to the value held by the register 35. This is equivalent to an increase in the acceleration period Ta and an increase in the deceleration period Td by the same value for the purpose of increasing the transfer distance when the acceleration and deceleration operations are performed. On the other hand, when there is a positive position difference, 1 is subtracted from the register 34, and 2 from the register 35. When there is a negative velocity difference, 1 is subtracted from register 35. Thereby only the deceleration period Td is decreased without changing the acceleration period Ta, the difference between the acceleration and deceleration periods is increased, and thus the velocity at the completion of the deceleration is increased. Since the acceleration period Ta is not changed this time, the distance transferred during the acceleration and deceleration operations is hardly changed by this modification. On the other hand, when the velocity difference is positive, the value held by the register 35 is increased by 1, and thereby the velocity at the completion of the deceleration is made to be smaller. The values of the acceleration and deceleration periods are modified by very small values such as ±1 or ±2 when one acceleration and deceleration operation ends. During the course of several repeated acceleration and deceleration operations, however, a considerably large modification is performed. In order to avoid the possible danger that the values held by the registers 34 and 35 are erased by the disconnection of power, a structure may be adopted wherein non-volatile memories are connected to the registers 34 and 35 and the values of these registers are held in the non-volatile memories when the power is disconnected.

As described above, when correct acceleration and deceleration periods are set exactly, the optical beam spot 1 can be transferred to and stopped at the center of a target track in an accurate and stable manner without needing to detect the position and velocity of the spot 1 while it is moving from one track to the other, by accelerating and decelerating the actuator 4 according to these set periods.

Thus, the present invention makes it possible to transfer a transducer at high speed and in a stable and accurate manner from one track to another wherein successive and accurate signals of position and velocity need not be detected, and realize a high-speed, very accurate track access in an optical disc system or a magnetic disc system.

The above embodiment is described only as applied to an optical disc system for convenience of explanation. It is obvious that a similar system can be applied to a magnetic disc system or other systems wherein tracks are accessed.

What is claimed is:

1. A track access apparatus for positioning a transducer in alignment with recording tracks formed approximately concentrically on a disc-shaped recording medium, said transducer being accelerated and decelerated for an acceleration period and a deceleration period, respectively, when said transducer is moved from one of said tracks to another, said track access apparatus comprising:

detecting means operable in cooperation with said transducer for detecting an error signal representative of an error of said transducer relative to said tracks;

signal producing means which is supplied with said error signal and which controllably maintains first and second values indicative of said acceleration and said deceleration periods, for producing an acceleration-deceleration signal during said acceleration and said deceleration periods, respectively, both of which define a period of a transfer mode for transferring said transducer, said transfer mode being followed by an adjusting mode for adjusting a position of said transducer with respect to a track being reproduced, said signal adjusting mode by using said error signal so as to modify said acceleration and deceleration periods of said acceleration-deceleration signal;

switching means supplied with said error signal and said acceleration-deceleration signal for selectively outputting said acceleration-deceleration signal during said transfer mode and said error signal during said adjusting mode; and an actuator coupled to said switching means and energized by said acceleration-deceleration signal during said transfer mode and by said error signal during said adjusting mode for moving said transducer in a direction across said tracks, said actuator accelerating and decelerating said transducer during said acceleration and deceleration periods as determined solely by said first and second values, respectively, in said transfer mode, and moving said transducer using said error signal in said adjusting mode.

2. A track access apparatus as claimed in claim 1, wherein said signal producing means comprises:

mode signal producing means enabled when said transducer is transferred from one track to another for producing a mode signal representative of said transfer mode;

counting means enabled by said mode signal for counting a predetermined time interval equal to a sum of said acceleration and said deceleration periods to produce a counter output signal in said transfer mode;

a first register for controllably storing said first value;

a first comparator coupled to said counting means and said first register for comparing said counter output signal and said first value to produce a first comparison result signal; and means responsive to said comparison result signal for producing said acceleration-deceleration signal.

3. A track access apparatus as claimed in claim 2, wherein said signal producing means comprises:

a second register for controllably storing a third value related to said second value;

a second comparator coupled to said counting means and said second register for comparing said third value with said counter output signal to produce a second comparison result signal; and signal supply means for supplying said second comparison result signal to said mode signal producing means as a reset signal for resetting said mode signal.

4. A track access apparatus as claimed in claim 3, wherein said signal producing means further comprises:

adjusting means coupled to said signal supply means and said first and said second registers and responsive to said error signal for adjusting said first and said second values by the use of said error signal in said adjusting mode after said reset signal is produced by said signal supply means.

* * * * *

UNITED STATES PATENT AND TRADEMARK OFFICE
CERTIFICATE OF CORRECTION

PATENT NO. : 5,046,058

DATED : 09/03/91

INVENTOR(S) : Shimonou

It is certified that error appears in the above-identified patent and that said Letters Patent is hereby corrected as shown below:

Column 6,　　line 3, delete "is　made";

Column 9,　　line 5, after "signal", insert --producing means adjusting said first and second values and said--.

Signed and Sealed this

Twenty-second Day of June, 1993

Attest:

MICHAEL K. KIRK

*Attesting Officer*　　　*Acting Commissioner of Patents and Trademarks*